(12) United States Patent
Frydendal et al.

(10) Patent No.: US 11,041,529 B2
(45) Date of Patent: Jun. 22, 2021

(54) SLIDING BEARING PAD SUPPORT

(71) Applicant: Siemens Gamesa Renewable Energy A/S, Brande (DK)

(72) Inventors: Niels Karl Frydendal, Herning (DK); Kim Thomsen, Skørping (DK); Morten Thorhauge, Aarhus (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 81 days.

(21) Appl. No.: 16/492,343

(22) PCT Filed: Jan. 3, 2018

(86) PCT No.: PCT/EP2018/050090
§ 371 (c)(1),
(2) Date: Sep. 9, 2019

(87) PCT Pub. No.: WO2018/166663
PCT Pub. Date: Sep. 20, 2018

(65) Prior Publication Data
US 2021/0131493 A1    May 6, 2021

(30) Foreign Application Priority Data
Mar. 16, 2017   (DE) ............... 10 2017 204 406.3

(51) Int. Cl.
*F16C 17/03* (2006.01)
*F16C 33/08* (2006.01)
(Continued)

(52) U.S. Cl.
CPC ............. *F16C 33/08* (2013.01); *F16C 17/10* (2013.01); *F16C 25/04* (2013.01); *F16C 27/02* (2013.01)

(58) Field of Classification Search
CPC ........ F16C 11/086; F16C 17/03; F16C 25/04; F16C 27/02; F16C 2229/00; F16C 2360/31
See application file for complete search history.

(56) References Cited

U.S. PATENT DOCUMENTS

| 1,814,833 | A | * | 7/1931 | Doran ................ F16C 25/02 384/309 |
| 2,348,928 | A | * | 5/1944 | Sampatacos ........ F16C 32/0666 384/309 |

(Continued)

FOREIGN PATENT DOCUMENTS

| CH | 558481 A | * | 1/1975 | .............. B23P 15/14 |
| CN | 101761546 A | | 6/2010 | |

(Continued)

OTHER PUBLICATIONS

John C Nicholas: "Tilting Pad Journal Bearings With Spray-Bar Blockers and Bypass Cooling for High Speed, High Load Applications Lund's Tilting Pad Journal Bearing Pad Assembly Method View project", Proceedings of the 32nd Turbomachinery Symposium, Sep. 1, 2003, pp. 27-37, XP055707653, Texas A&M University, College Station, TX Retrieved from the Internet: URL:https://www.researchgate.net/profile/John_Nicholas13/publication/.

(Continued)

*Primary Examiner* — Phillip A Johnson
(74) *Attorney, Agent, or Firm* — Schmeiser, Olsen & Watts LLP

(57) ABSTRACT

A support of a bearing pad of a sliding bearing is provided. A bearing pad support connection is disclosed, including a bearing pad and a bearing pad support structure whereby the bearing pad is connected to a support structure by a ball joint. The bearing pad includes a ball head, and the support structure includes a ball socket. The bearing pad and the support structure are connected via a spring connection (Continued)

apply a force between the bearing pad and the support structure to force the ball head to rest movable in the ball socket.

15 Claims, 3 Drawing Sheets

(51) Int. Cl.
  *F16C 17/10* (2006.01)
  *F16C 25/04* (2006.01)
  *F16C 27/02* (2006.01)

(56) References Cited

U.S. PATENT DOCUMENTS

| | | | | |
|---|---|---|---|---|
| 3,497,276 A * | 2/1970 | Tessarzik | ............... | F16C 17/03 384/312 |
| 3,572,856 A * | 3/1971 | McHugh | ............... | F16C 17/03 384/309 |
| 3,791,703 A * | 2/1974 | Ifield | ............... | F01B 3/0073 384/117 |
| 4,643,592 A * | 2/1987 | Lewis | ............... | F16C 17/03 384/100 |
| 5,743,657 A * | 4/1998 | O'Reilly | ............... | F16C 17/03 384/312 |
| 6,623,164 B1 * | 9/2003 | Gozdawa | ............... | F16C 17/03 384/117 |
| 6,766,697 B1 * | 7/2004 | Perez | ............... | F16C 17/03 73/800 |
| 8,734,019 B2 * | 5/2014 | Palomba | ............... | F16C 43/02 384/312 |
| 9,297,363 B2 * | 3/2016 | Guerenbourg | ............... | F16C 17/03 |
| 9,453,431 B2 * | 9/2016 | Brahm | ............... | F16C 17/03 |
| 9,534,637 B2 * | 1/2017 | Livermore-Hardy | ............... | F16C 33/108 |

FOREIGN PATENT DOCUMENTS

| | | | | |
|---|---|---|---|---|
| CN | 205533759 U | | 8/2016 | |
| DE | 3622496 C1 | | 9/1987 | |
| DE | 102014226807 A1 | * | 6/2016 | ............ F16C 43/02 |
| FR | 1475790 A | | 4/1967 | |
| GB | 817137 A | | 7/1959 | |
| GB | 817737 A | | 8/1959 | |
| JP | 58013220 A | * | 1/1983 | ............ F16C 17/03 |
| JP | 61215809 A | * | 9/1986 | ............ F16C 17/03 |
| SU | 1270434 A1 | * | 11/1986 | ............ F16C 27/02 |

OTHER PUBLICATIONS

European Communication under Rule 71(3) EPC—Intention to Grant for Application No. 18 701 098.8.
PCT International Search Report & Written Opinion dated Mar. 20, 2018 corresponding to PCT International Application No. PCT/EP2018/050090.
Chinese Office Action dated Jan. 26, 2021 for Application No. 201880018519.9.

* cited by examiner

SLIDING BEARING PAD SUPPORT

CROSS-REFERENCE TO RELATED APPLICATIONS

This application claims priority to PCT Application No. PCT/EP2018/050090, having a filing date of Jan. 3, 2018, which is based on German Application No. 10 2017 204 406.3, having a filing date of Mar. 16, 2017, the entire contents both of which are hereby incorporated by reference.

FIELD OF TECHNOLOGY

The following relates to a support of a bearing pad of a sliding bearing.

BACKGROUND

Sliding bearings or plain bearings are known to be used in bigger machinery. Often these sliding bearings comprise bearing pads, that comprise a sliding surface. Bearing pads are mounted to a bearing ring and are to a certain extent flexible, movable or tiltable in respect to the bearing ring.

These bearing pads can adapt to the tolerances in the bearing, to deformation and to other tolerances in operating conditions. The adjustment of their sliding surface adapts to the surface of the counterpart to be supported.

Therefore, the bearing pads need a freedom to move. In high dynamic events, like in gusts acting on a wind turbine and thus on a bearing, the movement of the tilting pads can lead to unwanted movements, including micro-movements, of the bearing pads that can lead to higher wear in the bearing.

In addition, depending on the kind of connection of the tilting pads, the pads might come disconnected from the bearing ring due to movements in the bearing and a certain low pressure between the surface of the sliding pads and the surface sliding along them. This includes oil suction, for example.

SUMMARY

An aspect relates to an improved connection of the bearing pad to the bearing ring.

A bearing pad support connection is disclosed comprising a bearing pad and a bearing pad support structure, whereby the bearing pad is connected to a support structure by a ball joint. The bearing pad comprises a ball head, whereby the support structure comprises a ball socket.

The bearing pad and the support structure are connected via a spring connection, to apply a force between the bearing pad and the support structure, to force the ball head to rest movable in the ball socket.

A bearing pad used in a sliding bearing is connected to a part of the bearing by a bearing pad support connection. The bearing pad support connection comprises the bearing pad and the bearing pad support structure.

The bearing pad is connected to the support structure by a ball joint. Therefore, the bearing pad comprises a ball head and the support structure comprises a ball socket. The ball head is resting in the ball socket.

To allow a certain movement of the bearing pad within the bearing, the bearing pad needs to be connected to a part of the bearing in a way that it can perform a certain movement. This is especially a tilting movement of some degree. For example, the bearing pad can perform a tilting movement of five to ten degrees.

To perform the tilting movement of the pad, the ball head slides in the ball socket.

A counter part of the part of the bearing is in connection with the surface of the bearing pad. This counter part of the part of the bearing can perform a certain movement of several centimeters.

Due to the movement of the counterpart of the part of the bearing the bearing pad might be forced out of the ball joint. The bearing pad is in contact with the counter part of the part of the bearing and might adhere to the counterpart, for example due to an under-pressure between the surface of the bearing pad and the surface of the counterpart. When the counterpart moves in relation to the part of the bearing, the bearing pad, adhering to the counterpart, might be sucked out of the ball joint.

The bearing pad and the support structure are connected via a spring connection that applies a force between the bearing pad and the support structure to force the ball head to rest movable in the ball socket.

A spring connection is present between the support structure and the bearing pad. The spring connection comprises a spring that applies a force between the bearing pad and the support structure to force the bearing pad towards the support structure.

Thus, a force is applied that forces the ball head to rest in the ball socket. In addition, the spring connection allows the movement of the bearing pad in relation to the support structure. Thus, the ball head is forced to rest movable in the ball socket. Thus, the bearing pad cannot be lifted up by a counter part of the part of the bearing, and thus the ball head cannot be sucked out of the ball socket by the bearing pad that might adhere to the counterpart of the bearing.

Thus, damage to the bearing pad support is avoided. Thus, the necessity for service and maintenance of the bearing is limited.

The radius of the ball head is bigger than the thickness of the bearing pad in the area where the center axis of the ball joint crosses the bearing pad.

The ball head of the ball joint comprises a certain radius. The ball joint comprises a certain center axis, or axis of symmetry. The ball head is connected to the bearing pad and the bearing pad comprises a certain thickness.

The radius of the ball head is bigger than the thickness of the bearing pad. The thickness of the bearing pad in this respect is measured in the area where the center axis of the ball joint crosses the bearing pad.

The ball joint allows a certain tilting movement of the bearing pad in relation to the support structure. The tilting movement of the bearing pad is performed around one point of rotation. This point of rotation is identical with the center point of the ball head of the ball joint.

The type of tilting movement of the bearing pad in relation to the support structure can be influenced by the size of the ball head of the ball joint. When the radius of the ball head is bigger than the thickness of the bearing pad, the point of rotation of the bearing pad is high up in the bearing close to the surface or above the surface of the bearing pad with which the bearing pad is in contact with the counter part of the bearing.

The bearing pad comprises a certain length and width. The ball head is arranged off center of the bearing pad in respect to the length of the bearing pad.

The bearing pad comprises a certain physical size whereby the bearing pad most often has a rectangular shape seen from above and thus comprises a length and a width.

The length is defined in the direction of the movement of the counter part of the bearing, that is in contact with the upper surface of the bearing pad.

The bearing pad comprises a ball head that is connected to the bearing pad. The ball head is connected to the bearing pad off center from the bearing pad in respect to the length.

Thus, the center axis of the ball joint does not correspond with the middle of the length of the bearing pad. Seen along the length of the bearing pad the ball head is connected to the bearing pad at a point that is closer to one and of the bearing pad than to the other.

The location of the ball head at the bearing pad influences the distribution of forces transferred from the bearing pad through the ball joint. Thus, the distribution of forces transferred from the bearing pad to the support structure can be influenced by the location of the ball joint at the bearing pad.

The bearing pad has a first end in the length direction pointing into the direction leading in the movement of the bearing pad, and a second end trailing in the direction of the movement of the bearing pad in respect to its counterpart.

The ball head is displaced along the length of the bearing pad from the center of the bearing pad towards the second end of the bearing pad.

The bearing pad slides along the counterpart of the bearing, when the bearing is in use. Seen from the bearing pad in respect to the counterpart the bearing pad moves in respect to the counterpart. The movement of the bearing pad in respect to the counterpart shows a certain direction.

A first end of the bearing pad is leading in the movement of the bearing pad, and a second end of the bearing pad is trailing. The ball head is connected to the bearing pad. Seen along the length of the bearing pad, the ball head is not connected at the middle of the length, and thus in the center of the bearing pad, but is displaced along the length of the bearing pad towards the second end, and thus the trailing end.

Depending on the location of the ball head at the bearing pad, the distribution of forces from the counterpart of the bearing to the bearing pad can be influenced. The distribution of forces in the bearing pad is relevant for the wear and the bearing pad.

In addition, the distribution of forces in the bearing pad is relevant for the stability of the bearing pad in the bearing. By placing the ball head off center towards the second end of the bearing pad the distribution of forces in the bearing pad can be optimized. Thus, stability and wear of the bearing pad can be optimized.

The ball head comprises a hole, and a spring connection is located in the hole of the ball head.

The diameter of the hole is bigger than the diameter of the spring connection to allow a movement of the ball head in the ball socket.

The bearing pad support connection comprises a spring connection. The ball joint comprises a ball socket and a ball head. The ball head comprises a hole that is leading from the support structure towards the bearing pad, and the spring connection is located in the hole of the ball head.

The hole in the ball head leading from the support structure to the bearing pad comprises a certain diameter. The diameter of the hole is bigger than the diameter of the spring connection. The spring connection has enough space in the hole to move, and thus not to block the movement of the ball joint. Thus, the movement of the ball head in the ball socket is possible.

The spring is applying a force that attracts the bearing pad towards the support structure. The spring connection is located in the hole of the ball head and thus the force is applied through the ball head of the ball joint. Thus, only one spring connection is necessary to avoid that the ball head is lifted out of the ball socket.

A spring connection comprises a spring and a bolt to apply a preload to the spring.

The spring connection comprises a spring and a bolt. The bolt is applying a force to the spring so that the spring is preloaded. The spring is under a certain tension to apply a force between the bearing pad and the support structure. Thus, a certain force is present between the bearing pad and the support structure.

The support structure comprises a bolt hole and the bearing pad comprises a thread. The bolt reaches through the bolt hole to the thread, and the spring is located between the bolt head and the support structure.

The spring connection between the bearing pad and the support structure comprises a spring and a bolt.

The bearing pad comprises a thread to allow the bolt to be screwed into the bearing pad. The support structure comprises a hole and the bolt is leading through the hole.

The spring is present between the bolt head and the support structure. By screwing the bolt into the bolt hole the spring gets preloaded by the bolt head. Thus, the connection between the bearing pad and the support structure is established and the spring is loaded with a preload.

The spring connection comprises a bushing, and the bushing at least partially surrounds the spring.

The bushing comprises an outward oriented rim on a first end resting on a support structure, and an inward oriented rim at the second end that is in contact with the spring to transfer the spring force to the support structure.

The spring connection comprises a bolt, a spring, and a bushing. The bearing pad comprises a thread and the bolt is screwed into the thread. The spring is present around the shaft of the bolt between the bolt head and the bearing pad. The bushing surrounds the spring and the bolt.

The bushing comprises an invert inward oriented rim and the end of the bushing facing the bearing pad. The spring is in contact with the inward oriented rim, and is resting on the rim. The bushing comprises an outward oriented rim at the opposite end of the bushing. The outward oriented rim of the bushing rests at the support structure. Thus, the force of the spring is transferred over the bushing towards the support structure.

The spring connection comprises a spacer element located between the bolt and the spring, whereby the spacer element comprises an outward oriented rim at the bolt head end to engage with the spring.

The spring connection comprises a bolt, a spring, a bushing, and a spacer. The bushing comprises an outward oriented rim that rests at the support structure. The spring is located within the bushing and rests at the inward oriented rim of the bushing.

The bolt is located within the spring and is attached to the thread in the bearing pad.

The spacer is present between the bolt and the spring. The spacer comprises an outward oriented rim that is in contact with the spring and transfers the force from the bolt to the spring. Thus, the spring is covered on both sides, inwardly and outwardly, by the spacer element and by the bushing.

Thus, the spring is protected during the movement of the bearing pad in respect to the support structure.

The spring connection comprises at least two bolts and springs, and the bolts and springs are arranged around the ball joint.

The spring connection comprises a bolt and a spring. The support structure comprises a hole and the bolt is leading through the hole and the support structure. The bolt is fixed in a thread in the bearing pad.

The spring is located between the bolt head and the support structure, and is preloaded by the bolt. The spring connection comprises a second bolt and a second spring that are arranged in the same way as the first bolt and the first spring.

The two bolts and springs are arranged distributed close to the ball joint. The two bolts and springs can be arranged at the support structure on opposite sides, right and left next to the ball joint. In addition, there can be a third set of bolt and spring, or even a higher number of bolt and spring combination that are arranged around the ball joint to connect the support structure to the bearing pad in a movable way.

Thus, the spring connections are distributed around the ball joint. Thus, no hole is necessary to lead through the ball joint. Thus, the surface area of the ball socket and the ball head that are in contact to each other is maximized.

The spring connection comprises four bolts that each through four bolt holds in the support structure, and are attached to a thread in the bearing pad each.

A spring is arranged around every bolt that is in contact with the bolt head and the support structure to apply a force between the support structure and the bearing pad.

The bolts are arranged mainly evenly distributed around the ball joint.

The bearing pad is connected to the support structure by a ball joint. The bearing pad comprises the ball head. The ball head is connected to the bearing pad at one side of the bearing pad.

The ball head comprises a certain circumference, where it is connected to the bearing pad. The four spring connections are distributed along the circumference of the ball head, with a certain distance to the ball head.

The bearing pad is used in a bearing and experiences a certain direction of movement. With four spring connection, two spring connections are closer to the leading end of the bearing pad, and two spring connections are closer to the trailing end of the bearing pad.

Thus, the distribution of forces between the support connection and the bearing pad through the bolts and the springs can be evenly distributed and optimized.

At least one bolt of the spring connections is adjusted in a way to apply a different spring preload to the connection between the support structure and the bearing pad.

Depending on the location of the spring connection in respect to the ball head and the movement of direction of the bearing pad, the bolts of the spring connections can be adjusted to apply different forces to the spring connections.

Thus at least one bolt of the spring connection is adjusted in a way to apply a different spring preload. Thus, the distribution of forces in the spring connections can be optimized by adjusting the bolts, and thus the preload in the spring, to different values.

The spring preload of the bolt in the spring connection is adjusted in a way, that a bolt located in the direction of movement of the bearing pad in respect to its counterpart applies less preload to the spring when a bolt located in a trailing end of the bearing pad.

Thus, the distribution of forces, applied by the spring connection from the support structure to the bearing pad, can be adjusted in a way, that the force distribution in the bearing pad, and the movement of the bearing pad in the ball joint, is optimized to the needs of the bearing pad in the bearing.

The use of a sliding bearing is disclosed comprising a bearing pad support connection as described herein.

The sliding bearing is used in a wind turbine.

The sliding bearing comprising a bearing pad support connection as disclosed, is used in a wind turbine as a main bearing, for example, as a secondary bearing, or as a pitch bearing, or the yaw bearing.

BRIEF DESCRIPTION

Some of the embodiments will be described in detail, with references to the following Figures, wherein like designations denote like members, wherein.

DETAILED DESCRIPTION

Figure 1:
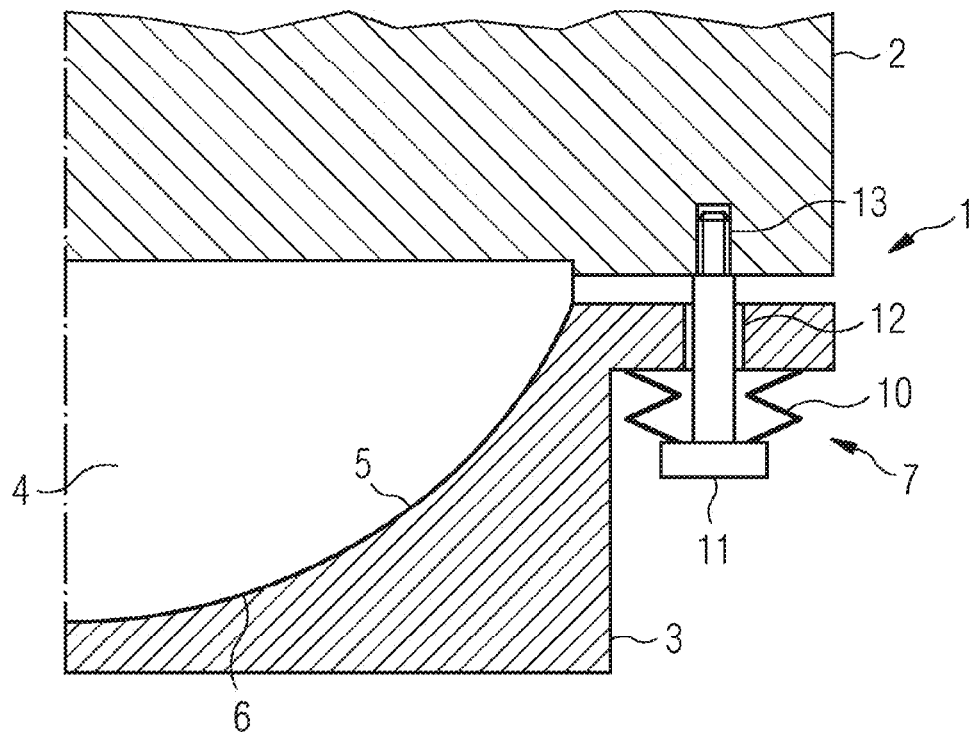
FIG. 1 shows an embodiment of a bearing pad support connection.

FIG. 1 shows a bearing pad support connection.

FIG. 1 shows a bearing pad support connection 1, the bearing pad 2 is connected to a support structure 3.

The bearing pad 2 is connected to the support structure 3 by a ball joint 4. The bearing pad 2 comprises a ball head 6, and a support structure 3 comprises a ball socket 5.

The bearing pad 2 is connected to the support structure 3 by a spring connection 7. The spring connection 7 comprises a bolt 11 and a spring 10.

The support structure 3 comprises a bolt hole 12, and the bearing pad 2 comprises a thread 13. The bolt 11 is leading through the bolt hole 12 to the thread 13 in the bearing pad 2.

The spring 10 is arranged between the head of the bolt 11 and the support structure 3 to apply a force to the head of the bolt 11 to force the head of the bolt 11 away from the support structure 3. The force of the spring 10 is transferred by the bolt 11 to the bearing pad 2. Thus, a force is applied between the ball socket 5 and the ball head 6 that forces the ball head 6 towards the ball socket 5 and thus, forces the ball head 6 to rest in the ball socket 5, also when a certain force is applied to the bearing pad 2.

The diameter of the bolt hole 12 is larger than the diameter of the bolt 11, thus, the bolt 11 can move in the bolt hole 12. This allows the ball head 6 to move in a ball socket 5. Thus, the bearing pad 2 has a certain degree of freedom to move in a relation to the support structure 3.

Even if a force is applied to the bearing pad 2 that pulls at the bearing pad, the spring connection 7 forces the ball head 6 to rest in the ball socket 5 in a movable manner.

Figure 2:
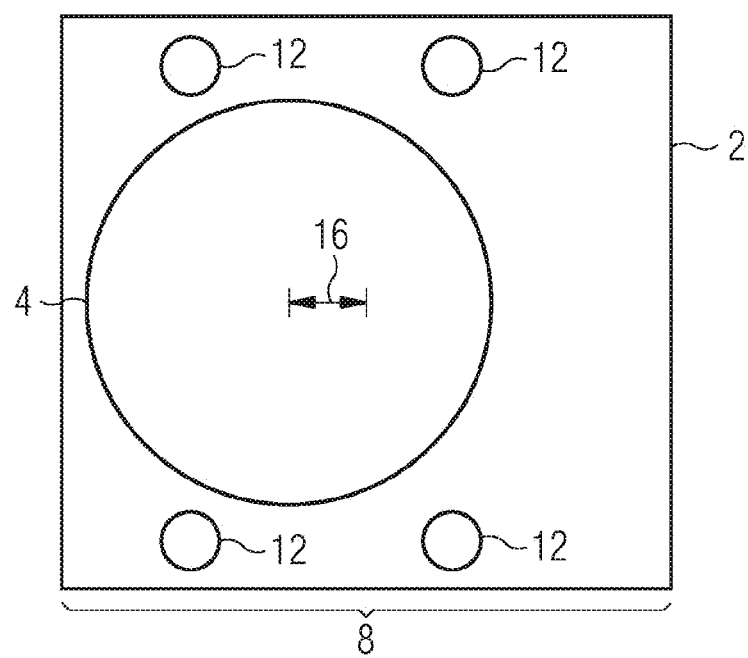
FIG. 2 shows an embodiment of the bearing pad with a ball joint.

FIG. 2 shows the bearing pad with the ball joint.

FIG. 2 shows the bearing pad 2 with the ball joint 4. The bearing pad 2 has a certain length 8. The length of the bearing pad is measured in the direction of movement of the bearing pad in relation to a counterpart during the operation of the bearing.

The ball joint 4 is displaced from the middle of the length 8 of the bearing pad 2 by a certain distance 16. Thus, the ball joint 4 is not arranged in the middle of the length of the bearing pad 2.

During the operation of the bearing, the bearing pad 2 has an end leading in the movement of the bearing pad and an end trailing in the movement. The ball joint 4 is displaced in relation to the mid of the length of the bearing pad 2, in the direction of the trailing end of the bearing pad 2.

FIG. 2 shows where the bolt holes 12 come to rest in respect to the bearing pad 2. The bolt holes 12 are arranged around the ball joint 4.

In this version of the bearing pad support connection, four bolt holes 12 are arranged around the ball joint 4. The bolt holes 12 of the support structure correspond to the threads in the bearing pad 2.

Figure 3:
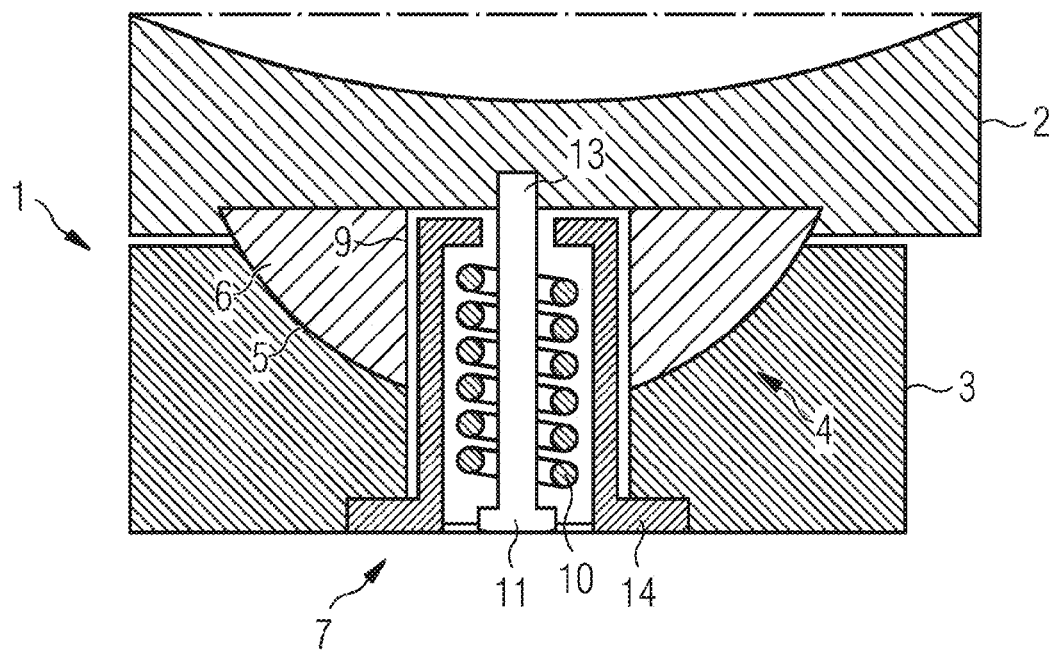
FIG. 3 shows another embodiment of a bearing pad support connection.

FIG. 3 shows another embodiment of the bearing pad support connection 1.

The bearing pad support connection 1 comprises a bearing pad 2 and a support structure 3. The bearing pad 2 and the support structure 3 are connected by a ball joint 4. The bearing pad 2 comprises a ball head 6 and a support structure 3 comprises a ball socket 5.

A spring connection 7 connects the bearing pad 2 to the support structure 3. The spring connection 7 comprises a bolt 11 that is connected to a thread 13 and a bearing pad 2 and a spring 10 that is arranged between the head of the bolt 11 and a bearing pad 2.

The bolt 11 is leading through a hole 9 in the ball head 6.

The bushing 14 is arranged between the spring 10 and the support structure 3 or the ball head 6.

The diameter of the bushing 14 is bigger than the diameter of the bolt 11. Thus, the bolt 11 can move within the bushing 14 and thus, allow a movement of the ball head 6 in the ball socket 5 of the ball joint 4. Thus, the bearing pad 2 is movable in respect to the support structure 3.

The bushing 14 comprises an inward leading rim. The spring 10 is resting at the head of the bolt 11 at its one end and is resting at the rim of the bushing 14 and its other end. The spring 10 applies a force between the head of the bolt 11 and the inward leading rim of the bushing 14. The spring 10 pushes the bolt 11 and the inward leading rim of the bushing 14 apart from each other.

The force of the spring 10 that is applied to the bushing 14, is transferred to the support structure 3 by an outward leading rim at a second end of the bushing 14. Thus, a force is applied by the spring 10 between the support structure 3 and the bearing pad 2, forcing the bearing pad 2 towards the support structure 3 and thus, forcing the ball head 6 to rest movable in a ball socket 5. Thus, even if a certain force is applied to the bearing pad 2 that forces the bearing pad away from the support structure 3, the bearing pad 2 with the ball head 6 will rest in the ball socket 5 of the support structure 3.

Figure 4:
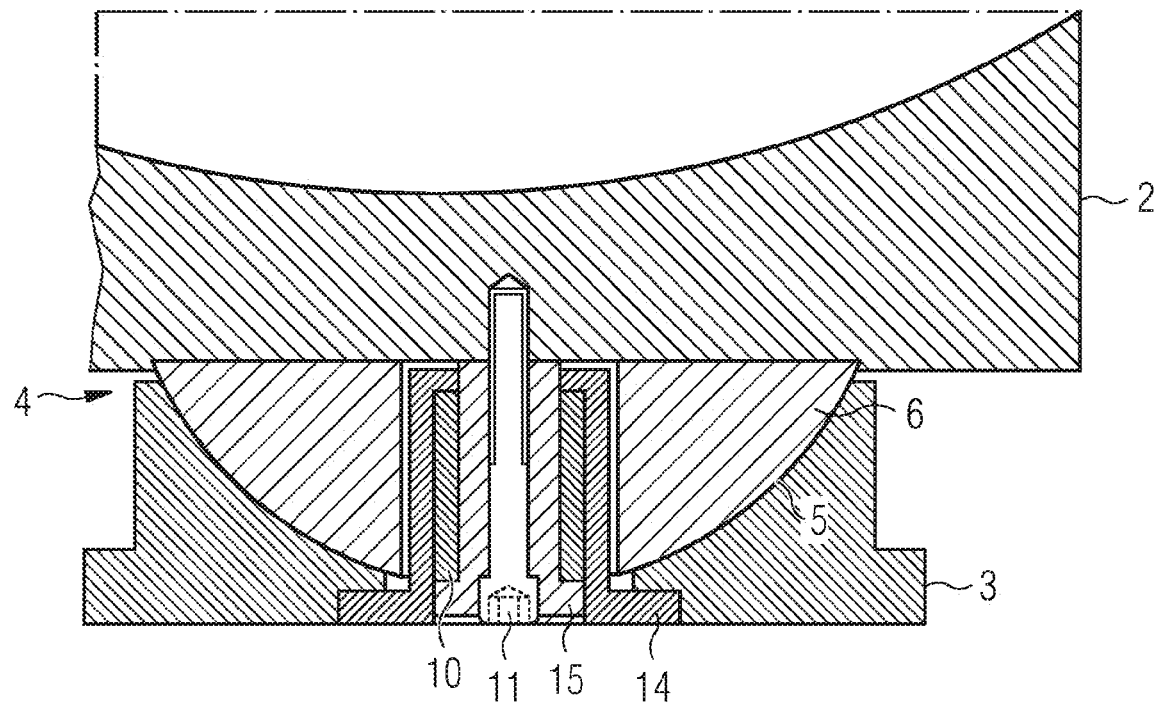
FIG. 4 shows a further embodiment of a bearing pad support connection.

FIG. 4 shows a further embodiment of the bearing pad support connection.

A bearing pad 2 is connected to a support structure 3 by a ball joint 4. The bearing pad 2 is connected to the support structure 3 by a spring connection 7. A bolt 11 is connected to a thread of the bearing pad 2.

A spacer 15 is arranged around the bolt 11. A bushing 14 is arranged around the spacer 15. A spring 10 is present between the bushing 14 and the spacer 15.

The spacer 15 comprises an outward leading rim and the bushing 14 comprises an inward leading rim and the spring 10 is resting on the inward leading rim of the bushing 14 at its first end and at the outward leading rim of the spacer 15 at its other end.

The spring is introducing a force between the bushing 14 and the spacer 15 forcing the two rims away from each other. The bushing 14 comprises an outward leading rim that transfers the force implied by the spring to the support structure 3.

The force of the spring 10 keeps the ball head 6 to rest movable in a ball socket 5. When a force is applied to the bearing pad 2, in the direction to pull the bearing pad away from the support structure, the spring connection 7 forces the bearing pad 2 with the ball head 6 to rest in the ball socket 5.

With an even higher force acting on the bearing pad 2, the bearing pad 2 with the ball head 6 might be forced out of the ball socket 5 of the ball joint 4. Nevertheless, the spring connection 7 will force the ball head 6 back into the ball socket 5, so that the bearing pad 2 moves back into its original position.

Figure 5:
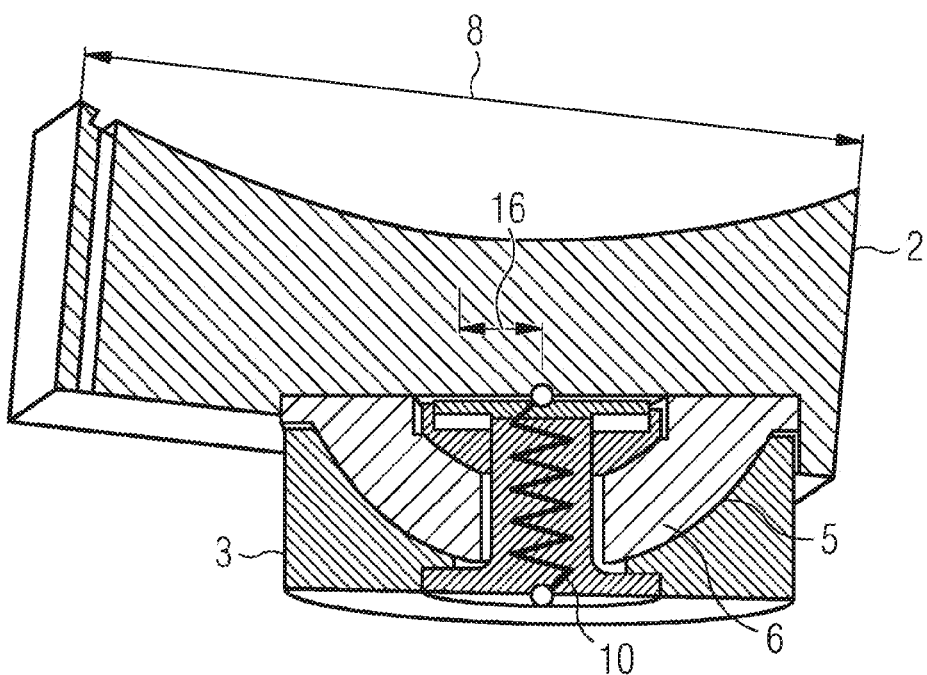
FIG. 5 shows a location of the ball joint at the bearing pad.

FIG. 5 shows the location of the ball joint at the bearing pad.

FIG. 5 shows a bearing pad support connection with the bearing pad 2 and the support structure 3. The bearing pad 2 is connected to the support structure 3 by a ball joint 4. The ball joint 4 comprises a ball head 6 in a ball socket 5.

A spring connection 7 is present between the support structure 3 and the bearing pad 2. The spring connection 7 comprises a spring 10 pulling the bearing pad 2 towards the support structure 3.

The bearing pad 2 comprises a length 8. The length 8 of the bearing pad 2 is measured in the direction of the movement of the bearing pad in relation to its counterpart when the bearing is in operation. The mid of the ball joint 4 is displaced from the mid of the bearing pad 2 in relation to its length 8.

When the bearing is in operation, the bearing pad 2 has a leading end and a trailing end. The displacement 16 of the ball joint 4 is measured from the mid of the length 8 of the bearing pad 2 towards the trailing end of the bearing pad.

The ball joint 4 is connected to the backside of the bearing pad, thus, the side of the bearing pad 2 that is pointing away from the side of the bearing pad that will be in contact with the counterpart when the bearing is in operation.

The illustration in the drawings is in schematic form. It is noted that in different figures, similar or identical elements are provided with the same reference signs.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A bearing pad support connection comprising:
   a bearing pad; and
   a bearing pad support structure connected to the bearing pad a by a ball joint, wherein the bearing pad comprises a ball head and the bearing pad support structure comprises a ball socket;
   wherein the bearing pad and the bearing pad support structure are connected via a spring connection to apply a force between the bearing pad and the bearing pad support structure to force the ball head to moveably rest in the ball socket.

2. The bearing pad support connection according to claim 1, wherein a radius of the ball head is bigger than a thickness of the bearing pad in an area where a center axis of the ball joint crosses the bearing pad.

3. The bearing pad support connection according to claim 1, wherein the bearing pad comprises a length and a width, and that the ball head is arranged off-center on the bearing pad with respect to the length of the bearing pad.

4. The bearing pad support connection according to claim 3, wherein the bearing pad has a first end in a length direction pointing into a direction leading in a movement of the bearing pad, and a second end trailing in a direction of the movement of the bearing pad with respect to a counterpart, and that the ball head is displaced along the length of the bearing pad from the center of the bearing pad towards the second end of the bearing pad.

5. The bearing pad support connection according to claim 1, wherein the ball head comprises a hole, and the spring connection is located in the hole of the ball head, wherein a diameter of the hole is bigger than a diameter of the spring connection to allow a movement of the ball head in the ball socket.

6. The bearing pad support connection according to claim 1, wherein the spring connection comprises a spring and a bolt to apply a pre-load to the spring.

7. The bearing pad support connection according to claim 6, wherein the bearing pad support structure comprises a bolt hole, and the bearing pad comprises a thread, and the bolt reaches through the bolt hole to the thread, and the spring is located between the bolt head and the bearing pad support structure.

8. The bearing pad support connection according to claim 6, wherein the spring connection comprises a bushing, and the bushing at least partially surrounds the spring, whereby the bushing comprises an outward oriented rim on a first end resting on the bearing pad support structure and an inward oriented rim at the second end that is in contact with the spring, to transfer the spring force to the bearing pad support structure.

9. The bearing pad support connection according to claim 8, wherein the spring connection comprises a spacer element located between the bolt and the spring, and the spacer element comprises an outward oriented rim at the bolt head end to engage with the spring.

10. The bearing pad support connection according to claim 6, wherein the spring connection comprises at least two bolts and springs, and that the at least two bolts and springs are arranged around the ball joint.

11. The beaning pad support connection according to claim 1, wherein the spring connection comprises four bolts that reach through four bolt holes in the bearing pad support structure and are attached to a thread in the bearing pad each, and that a spring is arranged around every bolt that is in contact with a bolt head and the bearing pad support structure, to apply a force between the bearing pad support structure and the bearing pad, and that the four bolts are evenly distributed around the ball joint.

12. The bearing pad support connection according to claim 11, wherein at least one bolt of the spring connection is adjusted in a way to apply a different spring preload to the connection between the bearing pad support structure and the bearing pad.

13. The bearing pad support connection according to claim 12, wherein the spring preload of the bolt in the spring connection is adjusted in a way that a bolt located in a direction of movement of the bearing pad with respect to a counterpart applies less preload to the spring than a bolt located at a trailing end of the bearing pad.

14. A method comprising:
 utilizing a sliding bearing comprising the bearing pad support connection according to claim 1 in a wind turbine.

15. The method according to claim 14, wherein the sliding bearing is used in the wind turbine.

* * * * *